Sept. 17, 1940.　　　　C. C. UTZ　　　　2,215,280
VEHICLE STEERING APPARATUS
Filed Sept. 25, 1939
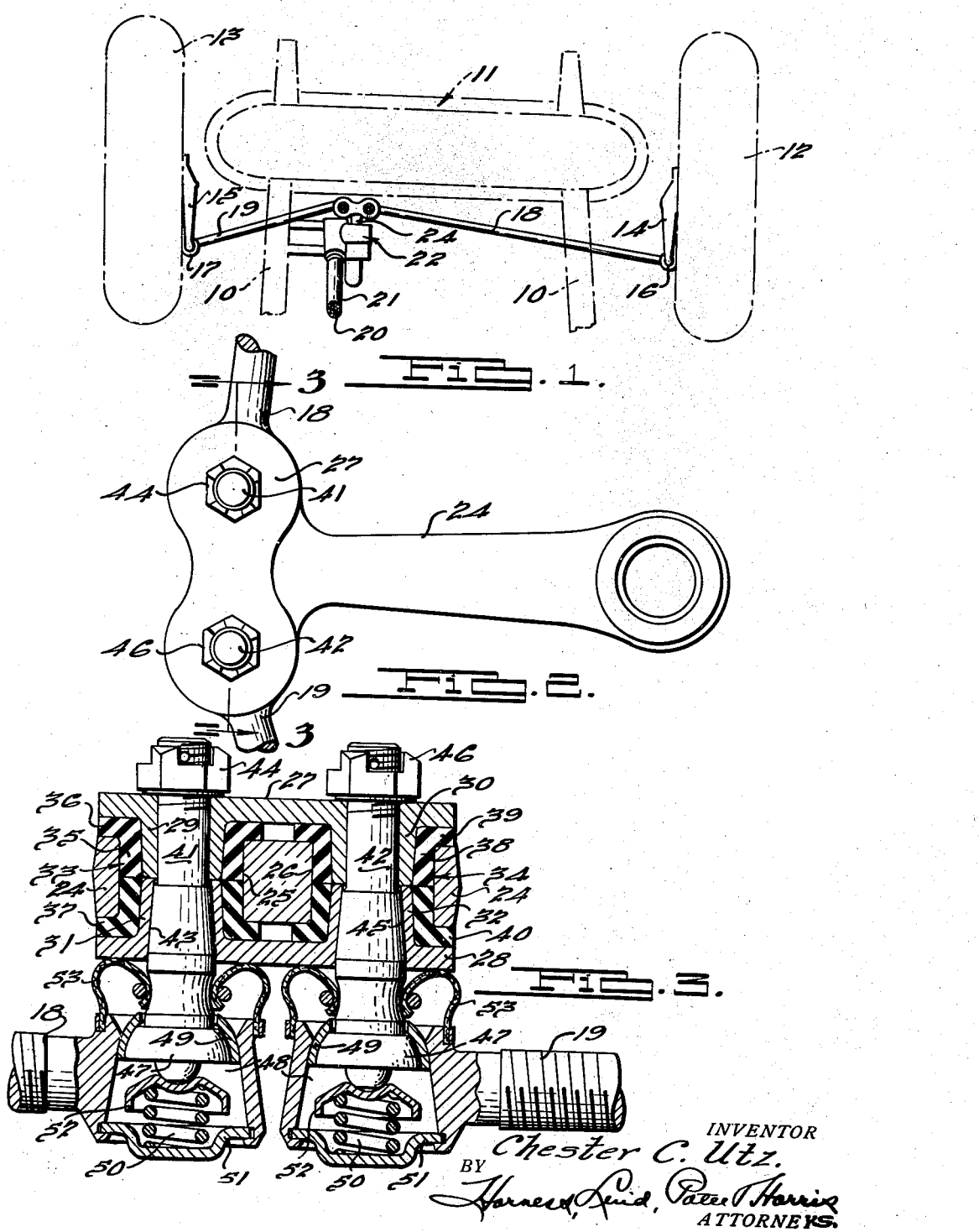
INVENTOR
Chester C. Utz.
BY
Harness, Dick, Pater & Harris
ATTORNEYS.

Patented Sept. 17, 1940

2,215,280

UNITED STATES PATENT OFFICE 2,215,280

VEHICLE STEERING APPARATUS

Chester C. Utz, Detroit, Mich., assignor to Chrysler Corporation, Highland Park, Mich., a corporation of Delaware Application September 25, 1939, Serial No. 296,329

10 Claims. (Cl. 74—470)

This invention relates to improvements in steering apparatus particularly adapted for motor vehicles.

An object of the invention is to provide an improved steering apparatus having means for absorbing shocks developed therein and for preventing shocks which are developed at particular locations in the apparatus from being transmitted to other locations in the apparatus which are remotely disposed from the first mentioned locations.

Another object of the invention is to provide in a steering apparatus having positively connected steering movement imparting elements and actuating means therefor, of improved means for connecting the elements and actuating means, the connection including a body of deformable yieldable material which prevents the transmission of shocks between the elements and the actuating means.

Further objects of the invention are to provide an improved connection of the above type for the tie rods and actuating means therefor, the connection representing a simplified design which can be accommodated in a relatively limited space and which can be economically manufactured; to provide a connection of this type wherein metal-to-metal contact limits the initial force exerted on the yieldable material included in the connection, and more particularly to so arrange the parts as to substantially predetermine the initial compressive force to which the yieldable material is subjected when the parts are assembled; and to provide a connection wherein the parts are so interengaged or interlocked that the steering apparatus will remain operative for transmitting steering movements in the event of failure of the yieldable material included in the connection.

Other objects and advantages of the invention will be more apparent from the following description taken in connection with the accompanying drawing, in which:

Fig. 1 is a plan view of the chassis of the motor vehicle embodying a steering apparatus according to the invention.

Fig. 2 is a fragmentary top plan view of a portion of the steering apparatus shown in Fig. 1.

Fig. 3 is a sectional view taken as indicated by the line 3—3 of Fig. 2.

Referring to the drawing, the invention is illustrated and described in connection with a motor vehicle chassis including longitudinally extending transversely spaced frame side rails 10 which are connected by a transversely extending structure indicated at 11. The dirigible front steerable road wheels 12 and 13 are each rotatably mounted on a suitable steering knuckle spindle (not shown) swivelled about a suitable king pin (not shown) for steering movement. The road wheels 12 and 13 may be supported for independent rising and falling movement by suitable means well known in the art and while the invention herein is particularly adapted for the foregoing type of wheel suspension, it is not to be limited in its broader aspects to the type of suspension employed.

The wheels 12 and 13 have rearwardly extending steering arms 14 and 15 respectively having terminal articulated connections 16 and 17 with the tie rods 18 and 19 respectively. The usual steering wheel (not shown) operates the shaft 20 disposed in the housing 21, conveniently positioned to one side of the longitudinal vertical mid-plane of the vehicle. The shaft 20 operates the usual reduction gearing generally indicated at 22 to oscillate or swing the pitman arm 24 in the well known manner for imparting steering movements to the wheels 12 and 13 through the tie rods 18 and 19. The pitman arm 24 terminates in a flaring end portion having spaced openings indicated at 25 and 26.

The connection between the pitman arm and the tie rods is more clearly shown in Fig. 3 and includes a pair of plate-like members 27 and 28 spaced from the adjacent face or surface of the arm 24. The plate 27 has hollow lateral projections 29 and 30 extending into the openings 25 and 26 respectively in spaced relation to the walls thereof, while the plate 28 has a pair of corresponding projections 31 and 32 extending into the openings 25 and 26 respectively in spaced relation to the walls thereof and registering with the projections 29 and 30 respectively. The inner wall surface of the projections 31 and 32 are tapered in the direction of the free end thereof for the purpose hereinafter set forth.

The connection between the tie rods 18, 19 and the arm 24 includes a yieldable non-metallic material, preferably rubber or a material having the characteristics of the latter, such material being in the form of spool-like members generally indicated at 33 and 34 which are preferably formed in complementary sections to facilitate manufacture and assembly. The spool member 33 has an axially extending portion 35 disposed in the space between the wall bounding the opening 25 and the projections 29 and 31. An end flange 36 is disposed in the space between the arm 24 and the plate 27 and a second end flange 37 is disposed between the arm 24 and the plate 28. The spool member 34 has an axially extending portion 38 disposed in the space between the wall bounding the opening 26 and the projections 30 and 32, and has spaced end flanges 39 and 40 arranged similarly to the flanges 36 and 37 respectively of the spool 33.

When the parts are in assembled position, as illustrated in Fig. 3, the extremities of the projections 29 and 30 engage the extremities of the projections 31 and 32 respectively to limit movement of the plates 27 and 28 toward the arm 24 and space the former from the latter. This action of the abutting extremities limits the compressive force which may be exerted on the yieldable material and particularly the lateral flanges thereof. When it is desired to place the yieldable material under an initial compressive force, between the arm 24 and the plates 27, 28, this initial compressive force may be predetermined by engagement of the registering lateral projections of the plates, thus providing a metal-to-metal limit on the clamping action to which the rubber may be subjected and preventing overstress thereof.

The plates 27 and 28 are secured to the pitman arm 24 by studs 41 and 42, the stud 41 extending through the hollow projections 29 and 31 and the stud 42 extending through the projections 30 and 32. The stud 41 has a tapered portion 43 which cooperates with the tapered portion of the projection 31 to limit axial movement thereof when the securing nut 44 is threaded thereon and the stud 42 has a tapered portion 45 which correspondingly cooperates with the tapered portion of the projection 32 when the nut 46 is threaded thereon.

The studs 41 and 42, in addition to securing the plates 27 and 28 to the pitman arm 24, serve also to connect the latter with the tie rods 18 and 19 respectively. For this purpose each stud projects below the bottom plate 28 and is provided with a fragmentary spherical end portion 47 disposed in an opening 48 in the adjacent end portion of the tie rod. A correspondingly shaped, hardened insert 49 bears between the portion 47 and the wall of the opening 48 and these parts are maintained in the illustrated position by a spring 50 acting between plates 51 and 52. This construction provides a suitable joint for accommodating relative movement between a stud and its associated tie rod, the joint being protected by a suitable shield 53.

In operation, the yieldable non-metallic material of the spool-like members 33, 34 is placed under compressive force in transferring movements from the pitman arm 24 to the tie rods 18, 19, and the yieldable material serves to dampen vibrations which would otherwise be transmitted from the steerable rod wheels through the connecting rods and pitman arm 24 to the steering mechanism. The parts of the connection are so interengaged or interlocked by reason of the projections of the plates 27 and 28 extending into the openings in the arm 24, that steering movements can be imparted to the rods 18, 19 by the arm 24 in the event of failure of the yieldable material of the spools 33, 34.

The arrangement illustrated includes a minimum number of parts and connections, and can be incorporated in a relatively limited space, a feature which is of particular importance in motor vehicle construction.

What I claim is:

1. In a steering apparatus including a pair of tie rods and operating means therefor comprising a swingable pitman arm having spaced openings therein, a pair of oppositely disposed plate-like members each having lateral projections extending into said openings respectively, a body of yieldable non-metallic material disposed between said projections and the walls of the openings receiving the latter, and a stud disposed in each of said openings for connecting said plates and said arm, said studs forming an operative connection between said arm and said tie rods respectively.

2. In a steering apparatus including a pair of tie rods and operating means therefor comprising a swingable pitman arm having spaced openings therein, a pair of oppositely disposed plate-like members each having a pair of hollow lateral projections extending respectively into said openings in spaced relationship to the walls thereof, the projections in each of said openings registering one with the other, yieldable non-metallic material disposed in the space between said projections and said walls, and a stud extending through each of the pair of said registering projections for securing said plates to said arm, said studs having an articulate connection with said tie rods respectively.

3. In a steering apparatus including a pair of tie rods and operating means therefor comprising a swingable pitman arm having spaced openings therein, a pair of oppositely disposed plate-like members each having a pair of lateral projections extending respectively into said openings in spaced relationship to the walls thereof, the projections in each of said openings having passages therein registering one with the other, yieldable non-metallic material disposed in the space between said projections and said walls, and a stud extending through each of the pair of said registering passages for securing said plates to said arm and having an articulated connection with a respective tie rod, each of said studs and the wall of the passage of one of said projections having tapered engaging surfaces.

4. In a steering apparatus including a pair of tie rods and operating means therefor comprising a swingable pitman arm having spaced openings therein, a pair of oppositely disposed plate-like members each having a pair of hollow lateral projections extending respectively into said openings in spaced relationship to the walls thereof, the projections in each of said openings registering one with the other, yieldable non-metallic material disposed between said arm and said plate-like members and in the space between said projections and said walls, and a stud extending through each pair of said registering projections for securing said plates to said arm and having an articulated connection with a respective tie rod.

5. In a steering apparatus including a pair of tie rods and operating means therefor comprising a swingable pitman arm having spaced openings therein, a pair of oppositely disposed plate-like members each having a pair of hollow lateral projections extending respectively into said openings in spaced relationship to the walls thereof, the projections in each of said openings registering one with the other, yieldable nonmetallic material disposed between said arm and said plate-like members and in the space between said projections and said walls, and a stud extending through each pair of said registering projections for securing said plates to said arm having an articulated connection with a respective tie rod, the projections of one of said plates cooperating with the projections of the other of said plates to space said plates from said arm.

6. In a steering apparatus including a pair of tie rods and operating means therefor comprising a swingable pitman arm having spaced openings therein, a pair of oppositely disposed plate-like members each having a pair of hollow lateral projections extending respectively into said openings in spaced relationship to the walls thereof, the projections in each of said openings registering one with the other, yieldable nonmetallic material disposed between said arm and said plate-like members and in the space between said projections and said walls, and means extending into said projections for securing said plates to said arm and operatively connecting the latter with said tie rods, said projections limiting movement of said plates toward said arm under the influence of said securing means.

7. In a steering apparatus including a pair of tie rods and actuating means therefor including a swingable pitman arm, means for operatively connecting said arm and rods including a pair of plate-like members disposed in spaced adjacent relationship to said arm, yieldable non-metallic material disposed in the space between said arm and said plates, means for securing said plate-like members to said arm, said securing means drawing said members toward said arm, and a stop on each of said members engaging one with the other for limiting the compressive force exerted on said material when said plates are secured to said arms, said securing means including studs having an articulated connection with a respective tie rod.

8. In a steering apparatus including a pair of tie rods and operating means therefor comprising a swingable pitman arm, a pair of studs having articulated connections with said tie rods respectively, means interlocked with said arm for operatively connecting the latter and said studs, and yieldable non-metallic material disposed between the interlocked portions of said arm and said last mentioned means.

9. In a steering apparatus including a pair of tie rods and actuating means therefor including a force transmitting member, means for operatively connecting said rods with said member comprising a pair of oppositely disposed plate-like elements having registering portions interengaged with said member, yieldable non-metallic material disposed between said member and each of said elements, and means for securing said elements to said member, said registering portions of said elements cooperating to space said elements relative to said member against the action of said securing means.

10. In a steering apparatus including a pair of tie rods and actuating means therefor comprising a force transmitting member, means for operatively connecting said rods with said member including a pair of oppositely disposed plate-like elements having portions thereof interengaged with said member, yieldable non-metallic material disposed between said interengaged portions, and means securing said elements to said member, said securing means forming an operating connection between said member and said rods, the portions of said elements interengaged with said member limiting movement of said elements toward said arm under the influence of said securing means.

CHESTER C. UTZ.